United States Patent [19]
Takahashi

[11] Patent Number: 5,956,305
[45] Date of Patent: Sep. 21, 1999

[54] OPTICAL DISK APPARATUS CAPABLE OF SIMULTANEOUSLY RECORDING USER DATA AND CORRECTION CODES

[75] Inventor: Hideki Takahashi, Nagareyama, Japan

[73] Assignee: Kabushiki Kaisha Toshiba, Kawasaki, Japan

[21] Appl. No.: 08/970,517

[22] Filed: Nov. 17, 1997

[30] Foreign Application Priority Data

Nov. 18, 1996 [JP] Japan .................................. 8-306264

[51] Int. Cl.⁶ ................................ G11B 5/09; G11B 5/02
[52] U.S. Cl. .................................. 369/47; 369/59; 360/27
[58] Field of Search .................................. 369/53, 59, 47, 369/48, 49, 58; 360/25, 27, 48, 53, 54

[56] References Cited

U.S. PATENT DOCUMENTS 4,907,215  3/1990  Sako et al. ................................ 369/59
5,517,484  5/1996  Takagi et al. ........................ 369/53 X

*Primary Examiner*—PAul W. Huber
*Attorney, Agent, or Firm*—Pillsbury Madison & Sutro LLP

[57] ABSTRACT

The present invention provides an optical disk apparatus for recording predetermined data on an optical disk having a concentric or spiral track for recording data and a plurality of sector regions each having a predetermined track length. The apparatus includes interface circuit for acquiring user data to be recorded on the optical disk, error correction circuit and data generating circuit for adding first error correcting parity data to the user data acquired by the interface circuit to generate first recording data and adding second error correcting parity data to the first recording data to generate second recording data, and optical head for involving the second recording data, generated by the error correction circuit and the data generating circuit, in a light beam and emitting the light beam to the optical disk to record the second recording data on the optical disk.

9 Claims, 12 Drawing Sheets

<G0>

| IN | OUT | IN | OUT | IN | OUT | IN | OUT | IN | OUT | IN | OUT | IN | OUT | IN | OUT |
|----|-----|----|-----|----|-----|----|-----|----|-----|----|-----|----|-----|----|-----|
| 00 | 00 | 20 | E8 | 40 | CD | 60 | 25 | 80 | 87 | A0 | 6F | C0 | 4A | E0 | A2 |
| 01 | 40 | 21 | A8 | 41 | 8D | 61 | 65 | 81 | C7 | A1 | 2F | C1 | 0A | E1 | E2 |
| 02 | 80 | 22 | 68 | 42 | 4D | 62 | A5 | 82 | 07 | A2 | EF | C2 | CA | E2 | 22 |
| 03 | C0 | 23 | 28 | 43 | 0D | 63 | E5 | 83 | 47 | A3 | AF | C3 | 8A | E3 | 62 |
| 04 | 1D | 24 | F5 | 44 | D0 | 64 | 38 | 84 | 9A | A4 | 72 | C4 | 57 | E4 | BF |
| 05 | 5D | 25 | B5 | 45 | 90 | 65 | 78 | 85 | DA | A5 | 32 | C5 | 17 | E5 | FF |
| 06 | 9D | 26 | 75 | 46 | 50 | 66 | B8 | 86 | 1A | A6 | F2 | C6 | D7 | E6 | 3F |
| 07 | DD | 27 | 35 | 47 | 10 | 67 | F8 | 87 | 5A | A7 | B2 | C7 | 97 | E7 | 7F |
| 08 | 3A | 28 | D2 | 48 | F7 | 68 | 1F | 88 | BD | A8 | 55 | C8 | 70 | E8 | 98 |
| 09 | 7A | 29 | 92 | 49 | B7 | 69 | 5F | 89 | FD | A9 | 15 | C9 | 30 | E9 | D8 |
| 0A | BA | 2A | 52 | 4A | 77 | 6A | 9F | 8A | 3D | AA | D5 | CA | F0 | EA | 18 |
| 0B | FA | 2B | 12 | 4B | 37 | 6B | DF | 8B | 7D | AB | 95 | CB | B0 | EB | 58 |
| 0C | 27 | 2C | CF | 4C | EA | 6C | 02 | 8C | A0 | AC | 48 | CC | 6D | EC | 85 |
| 0D | 67 | 2D | 8F | 4D | AA | 6D | 42 | 8D | E0 | AD | 08 | CD | 2D | ED | C5 |
| 0E | A7 | 2E | 4F | 4E | 6A | 6E | 82 | 8E | 20 | AE | C8 | CE | ED | EE | 05 |
| 0F | E7 | 2F | 0F | 4F | 2A | 6F | C2 | 8F | 60 | AF | 88 | CF | AD | EF | 45 |
| 10 | 74 | 30 | 9C | 50 | B9 | 70 | 51 | 90 | F3 | B0 | 1B | D0 | 3E | F0 | D6 |
| 11 | 34 | 31 | DC | 51 | F9 | 71 | 11 | 91 | B3 | B1 | 5B | D1 | 7E | F1 | 96 |
| 12 | F4 | 32 | 1C | 52 | 39 | 72 | D1 | 92 | 73 | B2 | 9B | D2 | BE | F2 | 56 |
| 13 | B4 | 33 | 5C | 53 | 79 | 73 | 91 | 93 | 33 | B3 | DB | D3 | FE | F3 | 16 |
| 14 | 69 | 34 | 81 | 54 | A4 | 74 | 4C | 94 | EE | B4 | 06 | D4 | 23 | F4 | CB |
| 15 | 29 | 35 | C1 | 55 | E4 | 75 | 0C | 95 | AE | B5 | 46 | D5 | 63 | F5 | 8B |
| 16 | E9 | 36 | 01 | 56 | 24 | 76 | CC | 96 | 6E | B6 | 86 | D6 | A3 | F6 | 4B |
| 17 | A9 | 37 | 41 | 57 | 64 | 77 | 8C | 97 | 2E | B7 | C6 | D7 | E3 | F7 | 0B |
| 18 | 4E | 38 | A6 | 58 | 83 | 78 | 6B | 98 | C9 | B8 | 21 | D8 | 04 | F8 | EC |
| 19 | 0E | 39 | E6 | 59 | C3 | 79 | 2B | 99 | 89 | B9 | 61 | D9 | 44 | F9 | AC |
| 1A | CE | 3A | 26 | 5A | 03 | 7A | EB | 9A | 49 | BA | A1 | DA | 84 | FA | 6C |
| 1B | 8E | 3B | 66 | 5B | 43 | 7B | AB | 9B | 09 | BB | E1 | DB | C4 | FB | 2C |
| 1C | 53 | 3C | BB | 5C | 9E | 7C | 76 | 9C | D4 | BC | 3C | DC | 19 | FC | F1 |
| 1D | 13 | 3D | FB | 5D | DE | 7D | 36 | 9D | 94 | BD | 7C | DD | 59 | FD | B1 |
| 1E | D3 | 3E | 3B | 5E | 1E | 7E | F6 | 9E | 54 | BE | BC | DE | 99 | FE | 71 |
| 1F | 93 | 3F | 7B | 5F | 5E | 7F | B6 | 9F | 14 | BF | FC | DF | D9 | FF | 31 |

| IN | OUT | IN | OUT | IN | OUT | IN | OUT | IN | OUT | IN | OUT | IN | OUT | IN | OUT |
|----|-----|----|-----|----|-----|----|-----|----|-----|----|-----|----|-----|----|-----|
| 00 | 00 | 20 | BB | 40 | 6B | 60 | D0 | 80 | D6 | A0 | 6D | C0 | BD | E0 | 06 |
| 01 | 78 | 21 | C3 | 41 | 13 | 61 | A8 | 81 | AE | A1 | 15 | C1 | C5 | E1 | 7E |
| 02 | F0 | 22 | 4B | 42 | 9B | 62 | 20 | 82 | 26 | A2 | 9D | C2 | 4D | E2 | F6 |
| 03 | 88 | 23 | 33 | 43 | E3 | 63 | 58 | 83 | 5E | A3 | E5 | C3 | 35 | E3 | 8E |
| 04 | FD | 24 | 46 | 44 | 96 | 64 | 2D | 84 | 2B | A4 | 90 | C4 | 40 | E4 | FB |
| 05 | 85 | 25 | 3E | 45 | EE | 65 | 55 | 85 | 53 | A5 | E8 | C5 | 38 | E5 | 83 |
| 06 | 0D | 26 | B6 | 46 | 66 | 66 | DD | 86 | DB | A6 | 60 | C6 | B0 | E6 | 0B |
| 07 | 75 | 27 | CE | 47 | 1E | 67 | A5 | 87 | A3 | A7 | 18 | C7 | C8 | E7 | 73 |
| 08 | E7 | 28 | 5C | 48 | 8C | 68 | 37 | 88 | 31 | A8 | 8A | C8 | 5A | E8 | E1 |
| 09 | 9F | 29 | 24 | 49 | F4 | 69 | 4F | 89 | 49 | A9 | F2 | C9 | 22 | E9 | 99 |
| 0A | 17 | 2A | AC | 4A | 7C | 6A | C7 | 8A | C1 | AA | 7A | CA | AA | EA | 11 |
| 0B | 6F | 2B | D4 | 4B | 04 | 6B | BF | 8B | B9 | AB | 02 | CB | D2 | EB | 69 |
| 0C | 1A | 2C | A1 | 4C | 71 | 6C | CA | 8C | CC | AC | 77 | CC | A7 | EC | 1C |
| 0D | 62 | 2D | D9 | 4D | 09 | 6D | B2 | 8D | B4 | AD | 0F | CD | DF | ED | 64 |
| 0E | EA | 2E | 51 | 4E | 81 | 6E | 3A | 8E | 3C | AE | 87 | CE | 57 | EE | EC |
| 0F | 92 | 2F | 29 | 4F | F9 | 6F | 42 | 8F | 44 | AF | FF | CF | 2F | EF | 94 |
| 10 | D3 | 30 | 68 | 50 | B8 | 70 | 03 | 90 | 05 | B0 | BE | D0 | 6E | F0 | D5 |
| 11 | AB | 31 | 10 | 51 | C0 | 71 | 7B | 91 | 7D | B1 | C6 | D1 | 16 | F1 | AD |
| 12 | 23 | 32 | 98 | 52 | 48 | 72 | F3 | 92 | F5 | B2 | 4E | D2 | 9E | F2 | 25 |
| 13 | 5B | 33 | E0 | 53 | 30 | 73 | 8B | 93 | 8D | B3 | 36 | D3 | E6 | F3 | 5D |
| 14 | 2E | 34 | 95 | 54 | 45 | 74 | FE | 94 | F8 | B4 | 43 | D4 | 93 | F4 | 28 |
| 15 | 56 | 35 | ED | 55 | 3D | 75 | 86 | 95 | 80 | B5 | 3B | D5 | EB | F5 | 50 |
| 16 | DE | 36 | 65 | 56 | B5 | 76 | 0E | 96 | 08 | B6 | B3 | D6 | 63 | F6 | D8 |
| 17 | A6 | 37 | 1D | 57 | CD | 77 | 76 | 97 | 70 | B7 | CB | D7 | 1B | F7 | A0 |
| 18 | 34 | 38 | 8F | 58 | 5F | 78 | E4 | 98 | E2 | B8 | 59 | D8 | 89 | F8 | 32 |
| 19 | 4C | 39 | F7 | 59 | 27 | 79 | 9C | 99 | 9A | B9 | 21 | D9 | F1 | F9 | 4A |
| 1A | C4 | 3A | 7F | 5A | AF | 7A | 14 | 9A | 12 | BA | A9 | DA | 79 | FA | C2 |
| 1B | BC | 3B | 07 | 5B | D7 | 7B | 6C | 9B | 6A | BB | D1 | DB | 01 | FB | BA |
| 1C | C9 | 3C | 72 | 5C | A2 | 7C | 19 | 9C | 1F | BC | A4 | DC | 74 | FC | CF |
| 1D | B1 | 3D | 0A | 5D | DA | 7D | 61 | 9D | 67 | BD | DC | DD | 0C | FD | B7 |
| 1E | 39 | 3E | 82 | 5E | 52 | 7E | E9 | 9E | EF | BE | 54 | DE | 84 | FE | 3F |
| 1F | 41 | 3F | FA | 5F | 2A | 7F | 91 | 9F | 97 | BF | 2C | DF | FC | FF | 47 |

| IN | OUT | IN | OUT | IN | OUT | IN | OUT | IN | OUT | IN | OUT | IN | OUT | IN | OUT |
|----|-----|----|-----|----|-----|----|-----|----|-----|----|-----|----|-----|----|-----|
| 00 | 00 | 20 | 8E | 40 | 01 | 60 | 8F | 80 | 02 | A0 | 8C | C0 | 03 | E0 | 8D |
| 01 | 36 | 21 | B8 | 41 | 37 | 61 | B9 | 81 | 34 | A1 | BA | C1 | 35 | E1 | BB |
| 02 | 6C | 22 | E2 | 42 | 6D | 62 | E3 | 82 | 6E | A2 | E0 | C2 | 6F | E2 | E1 |
| 03 | 5A | 23 | D4 | 43 | 5B | 63 | D5 | 83 | 58 | A3 | D6 | C3 | 59 | E3 | D7 |
| 04 | D8 | 24 | 56 | 44 | D9 | 64 | 57 | 84 | DA | A4 | 54 | C4 | DB | E4 | 55 |
| 05 | EE | 25 | 60 | 45 | EF | 65 | 61 | 85 | EC | A5 | 62 | C5 | ED | E5 | 63 |
| 06 | B4 | 26 | 3A | 46 | B5 | 66 | 3B | 86 | B6 | A6 | 38 | C6 | B7 | E6 | 39 |
| 07 | 82 | 27 | 0C | 47 | 83 | 67 | 0D | 87 | 80 | A7 | 0E | C7 | 81 | E7 | 0F |
| 08 | AD | 28 | 23 | 48 | AC | 68 | 22 | 88 | AF | A8 | 21 | C8 | AE | E8 | 20 |
| 09 | 9B | 29 | 15 | 49 | 9A | 69 | 14 | 89 | 99 | A9 | 17 | C9 | 98 | E9 | 16 |
| 0A | C1 | 2A | 4F | 4A | C0 | 6A | 4E | 8A | C3 | AA | 4D | CA | C2 | EA | 4C |
| 0B | F7 | 2B | 79 | 4B | F6 | 6B | 78 | 8B | F5 | AB | 7B | CB | F4 | EB | 7A |
| 0C | 75 | 2C | FB | 4C | 74 | 6C | FA | 8C | 77 | AC | F9 | CC | 76 | EC | F8 |
| 0D | 43 | 2D | CD | 4D | 42 | 6D | CC | 8D | 41 | AD | CF | CD | 40 | ED | CE |
| 0E | 19 | 2E | 97 | 4E | 18 | 6E | 96 | 8E | 1B | AE | 95 | CE | 1A | EE | 94 |
| 0F | 2F | 2F | A1 | 4F | 2E | 6F | A0 | 8F | 2D | AF | A3 | CF | 2C | EF | A2 |
| 10 | 47 | 30 | C9 | 50 | 46 | 70 | C8 | 90 | 45 | B0 | CB | D0 | 44 | F0 | CA |
| 11 | 71 | 31 | FF | 51 | 70 | 71 | FE | 91 | 73 | B1 | FD | D1 | 72 | F1 | FC |
| 12 | 2B | 32 | A5 | 52 | 2A | 72 | A4 | 92 | 29 | B2 | A7 | D2 | 28 | F2 | A6 |
| 13 | 1D | 33 | 93 | 53 | 1C | 73 | 92 | 93 | 1F | B3 | 91 | D3 | 1E | F3 | 90 |
| 14 | 9F | 34 | 11 | 54 | 9E | 74 | 10 | 94 | 9D | B4 | 13 | D4 | 9C | F4 | 12 |
| 15 | A9 | 35 | 27 | 55 | A8 | 75 | 26 | 95 | AB | B5 | 25 | D5 | AA | F5 | 24 |
| 16 | F3 | 36 | 7D | 56 | F2 | 76 | 7C | 96 | F1 | B6 | 7F | D6 | F0 | F6 | 7E |
| 17 | C5 | 37 | 4B | 57 | C4 | 77 | 4A | 97 | C7 | B7 | 49 | D7 | C6 | F7 | 48 |
| 18 | EA | 38 | 64 | 58 | EB | 78 | 65 | 98 | E8 | B8 | 66 | D8 | E9 | F8 | 67 |
| 19 | DC | 39 | 52 | 59 | DD | 79 | 53 | 99 | DE | B9 | 50 | D9 | DF | F9 | 51 |
| 1A | 86 | 3A | 08 | 5A | 87 | 7A | 09 | 9A | 84 | BA | 0A | DA | 85 | FA | 0B |
| 1B | B0 | 3B | 3E | 5B | B1 | 7B | 3F | 9B | B2 | BB | 3C | DB | B3 | FB | 3D |
| 1C | 32 | 3C | BC | 5C | 33 | 7C | BD | 9C | 30 | BC | BE | DC | 31 | FC | DF |
| 1D | 04 | 3D | 8A | 5D | 05 | 7D | 8B | 9D | 06 | BD | 88 | DD | 07 | FD | 89 |
| 1E | 5E | 3E | D0 | 5E | 5F | 7E | D1 | 9E | 5C | BE | D2 | DE | 5D | FE | D3 |
| 1F | 68 | 3F | E6 | 5F | 69 | 7F | E7 | 9F | 6A | BF | E4 | DF | 6B | FF | E5 |

| IN | OUT | IN | OUT | IN | OUT | IN | OUT | IN | OUT | IN | OUT | IN | OUT | IN | OUT |
|----|-----|----|-----|----|-----|----|-----|----|-----|----|-----|----|-----|----|-----|
| 00 | 00 | 20 | FD | 40 | E7 | 60 | 1A | 80 | D3 | A0 | 2E | C0 | 34 | E0 | C9 |
| 01 | 0F | 21 | F2 | 41 | E8 | 61 | 15 | 81 | DC | A1 | 21 | C1 | 3B | E1 | C6 |
| 02 | 1E | 22 | E3 | 42 | F9 | 62 | 04 | 82 | CD | A2 | 30 | C2 | 2A | E2 | D7 |
| 03 | 11 | 23 | EC | 43 | F6 | 63 | 0B | 83 | C2 | A3 | 3F | C3 | 25 | E3 | D8 |
| 04 | 3C | 24 | C1 | 44 | DB | 64 | 26 | 84 | EF | A4 | 12 | C4 | 08 | E4 | F5 |
| 05 | 33 | 25 | CE | 45 | D4 | 65 | 29 | 85 | E0 | A5 | 1D | C5 | 07 | E5 | FA |
| 06 | 22 | 26 | DF | 46 | C5 | 66 | 38 | 86 | F1 | A6 | 0C | C6 | 16 | E6 | EB |
| 07 | 2D | 27 | D0 | 47 | CA | 67 | 37 | 87 | FE | A7 | 03 | C7 | 19 | E7 | E4 |
| 08 | 78 | 28 | 85 | 48 | 9F | 68 | 62 | 88 | AB | A8 | 56 | C8 | 4C | E8 | B1 |
| 09 | 77 | 29 | 8A | 49 | 90 | 69 | 6D | 89 | A4 | A9 | 59 | C9 | 43 | E9 | BE |
| 0A | 66 | 2A | 9B | 4A | 81 | 6A | 7C | 8A | B5 | AA | 48 | CA | 52 | EA | AF |
| 0B | 69 | 2B | 94 | 4B | 8E | 6B | 73 | 8B | BA | AB | 47 | CB | 5D | EB | A0 |
| 0C | 44 | 2C | B9 | 4C | A3 | 6C | 5E | 8C | 97 | AC | 6A | CC | 70 | EC | 8D |
| 0D | 4B | 2D | B6 | 4D | AC | 6D | 51 | 8D | 98 | AD | 65 | CD | 7F | ED | 82 |
| 0E | 5A | 2E | A7 | 4E | BD | 6E | 40 | 8E | 89 | AE | 74 | CE | 6E | EE | 93 |
| 0F | 55 | 2F | A8 | 4F | B2 | 6F | 4F | 8F | 86 | AF | 7B | CF | 61 | EF | 9C |
| 10 | F0 | 30 | 0D | 50 | 17 | 70 | EA | 90 | 23 | B0 | DE | D0 | C4 | F0 | 39 |
| 11 | FF | 31 | 02 | 51 | 18 | 71 | E5 | 91 | 2C | B1 | D1 | D1 | CB | F1 | 36 |
| 12 | EE | 32 | 13 | 52 | 09 | 72 | F4 | 92 | 3D | B2 | C0 | D2 | DA | F2 | 27 |
| 13 | E1 | 33 | 1C | 53 | 06 | 73 | FB | 93 | 32 | B3 | CF | D3 | D5 | F3 | 28 |
| 14 | CC | 34 | 31 | 54 | 2B | 74 | D6 | 94 | 1F | B4 | E2 | D4 | F8 | F4 | 05 |
| 15 | C3 | 35 | 3E | 55 | 24 | 75 | D9 | 95 | 10 | B5 | ED | D5 | F7 | F5 | 0A |
| 16 | D2 | 36 | 2F | 56 | 35 | 76 | C8 | 96 | 01 | B6 | FC | D6 | E6 | F6 | 1B |
| 17 | DD | 37 | 20 | 57 | 3A | 77 | C7 | 97 | 0E | B7 | F3 | D7 | E9 | F7 | 14 |
| 18 | 88 | 38 | 75 | 58 | 6F | 78 | 92 | 98 | 5B | B8 | A6 | D8 | BC | F8 | 41 |
| 19 | 87 | 39 | 7A | 59 | 60 | 79 | 9D | 99 | 54 | B9 | A9 | D9 | B3 | F9 | 4E |
| 1A | 96 | 3A | 6B | 5A | 71 | 7A | 8C | 9A | 45 | BA | B8 | DA | A2 | FA | 5F |
| 1B | 99 | 3B | 64 | 5B | 7E | 7B | 83 | 9B | 4A | BB | B7 | DB | AD | FB | 50 |
| 1C | B4 | 3C | 49 | 5C | 53 | 7C | AE | 9C | 67 | BC | 9A | DC | 80 | FC | 7D |
| 1D | BB | 3D | 46 | 5D | 5C | 7D | A1 | 9D | 68 | BD | 95 | DD | 8F | FD | 72 |
| 1E | AA | 3E | 57 | 5E | 4D | 7E | B0 | 9E | 79 | BE | 84 | DE | 9E | FE | 63 |
| 1F | A5 | 3F | 58 | 5F | 42 | 7F | BF | 9F | 76 | BF | 8B | DF | 91 | FF | 6C |

FIG. 12

|  | INPUT DATA | R0 | R1 | R2 | R3 |
|---|---|---|---|---|---|
| STEP0 |  | 00 | 00 | 00 | 00 |
| STEP1 | 56 | 24 | B5 | F2 | 35 |
| STEP2 | F4 | 0A | E1 | 80 | C9 |
| STEP3 | AC | 78 | 5F | 80 | A9 |
| STEP4 | 03 | D5 | 02 | 12 | C8 |
| STEP5 | 98 | B9 | 6D | 44 | 05 |

FIG. 13

|  | INPUT DATA | R0 | R1 | R2 | R3 |
|---|---|---|---|---|---|
| STEP0 |  | 00 | 00 | 00 | 00 |
| STEP1 | 56 | 24 | B5 | F2 | 35 |
| STEP2 | F4 | 0A | E1 | 80 | C9 |
| STEP3 | AC | 78 | 5F | 80 | A9 |
| STEP4 | 03 | D5 | 02 | 12 | C8 |
| STEP5 | 98 | B9 | 6D | 44 | 05 |
| STEP6 | 05 | 00 | B9 | 6D | 44 |
| STEP7 | 44 | 00 | 00 | B9 | 6D |
| STEP8 | 6D | 00 | 00 | 00 | B9 |
| STEP9 | B9 | 00 | 00 | 00 | 00 |

OPTICAL DISK APPARATUS CAPABLE OF SIMULTANEOUSLY RECORDING USER DATA AND CORRECTION CODES

BACKGROUND OF THE INVENTION

The present invention relates to an optical disk apparatus for recording predetermined user data on an optical disk having a concentric or spiral track and, more particularly, to an optical disk apparatus for simultaneously recording user data and an error correction code (ECC) for correcting an error of the user data.

A rewritable optical disk and an optical disk apparatus for recording user data on such an optical disk have recently appeared. The optical disk has a concentric or spiral track, and a plurality of sector regions each having a predetermined track length are formatted in the track. A predetermined number of sector regions constitute an ECC block.

User data and error correction codes are recorded in the sector regions. What is noted is that the user data and error correction codes recorded in the same sector region do not possess a complete one-to-one correspondence to each other. The error correction codes are recorded at once for the user data recorded in all the sector regions constituting an ECC block. In other words, when user data in one of the sector regions constituting an ECC block is rewritten, error correction codes within all the sector regions constituting the ECC block must to be rewritten accordingly.

Consequently, in the optical disk apparatus, data is recorded or rewritten on the optical disk in units of ECC block. For example, when predetermined user data is recorded in a specific sector, data of the entire ECC block including the specific sector is read out of the optical disk by the optical disk apparatus. The predetermined user data is recorded in the specific sector of the ECC block, and a new ECC block is generated. Data of the newly-generated ECC block is recorded on the optical disk.

The foregoing optical disk apparatus has the problem that when data is recorded in an arbitrary sector region of a plurality of sector regions constituting an ECC block, data within all of sector regions has to be rewritten. This decreases the data recording speed, deteriorates the recording film of the optical disk, and lowers the reliability of data.

BRIEF SUMMARY OF THE INVENTION

An object of the present invention is to provide an optical disk apparatus and a data recording method capable of completely recording or rewriting data by recording or rewriting only data of a target sector region.

Another object of the present invention is to provide a method for generating recording data in order to complete recording or rewriting of data by recording or rewriting only data of a target sector region.

According to one aspect of the present invention, there is provided an optical disk apparatus for recording predetermined data on an optical disk, the optical disk having a concentric or spiral track for recording data and a plurality of sector regions each having a predetermined track length, the apparatus comprising:

acquisition means for acquiring user data to be recorded on the optical disk;

recording data generation means for adding first error correcting parity data to the user data acquired by the acquisition means to generate first recording data and adding second error correcting parity data to the first recording data to generate second recording data; and recording means for involving the second recording data, generated by the recording data generation means, in a light beam and emitting the light beam to the optical disk to record the second recording data on the optical disk.

According to another aspect of the present invention, there is provided a method for generating recording data, comprising the steps of:

acquiring user data to be recorded on an optical disk;

adding first error correcting parity data to the user data to generate first recording data;

adding second error correcting parity data to the first recording data to generate second recording data; and involving the second recording data in a light beam, and emitting the light beam to the optical disk to record the second recording data on the optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a data conversion table of memory G0;

FIG. 10 is a data conversion table of memory G1;

FIG. 11 is a data conversion table of memory G2;

FIG. 12 is a data conversion table of memory G3;

FIG. 13 is a table showing variations in values of registers R0 to R3 when data about information polynomial I(X) is input to an error correction code generation section;

FIG. 14 is a table showing variations in values of registers R0 to R3 when data about information polynomial $C_1(X)$ is input to an error correction code generation section.

DETAILED DESCRIPTION OF THE INVENTION

An embodiment of the present invention will now be described with reference to the accompanying drawings.

Figure 1:
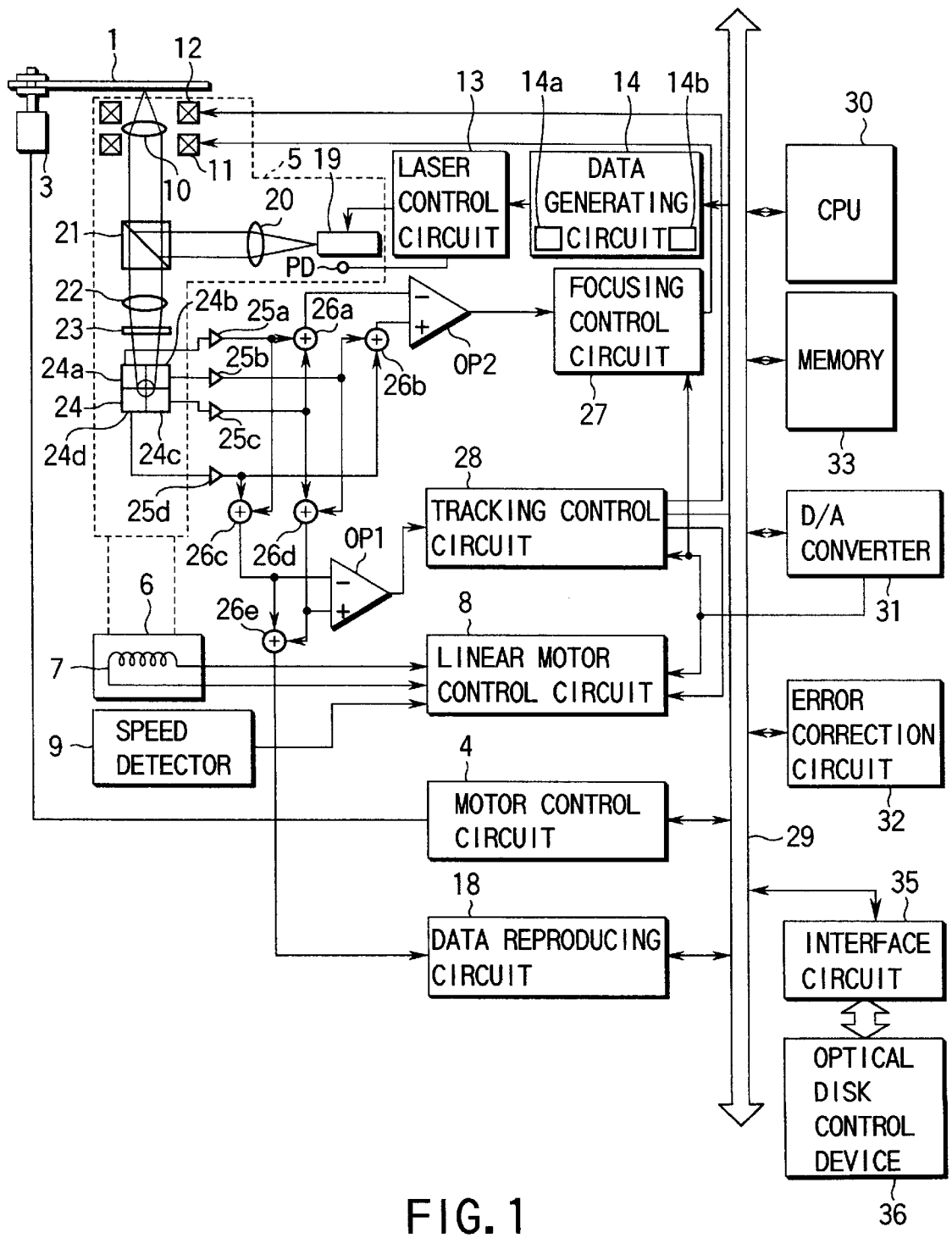
FIG. 1 is a block diagram illustrating a constitution of an optical disk apparatus according to an embodiment of the present invention.

FIG. 1 is a block diagram illustrating a constitution of an optical disk apparatus according to the embodiment of the present invention.

In the optical disk apparatus shown in FIG. 1, data is recorded on/reproduced from an optical disk 1. The optical disk 1 is formed by coating the surface of a substrate formed circularly by, e.g., glass or plastics, with a metal coating layer, such as tellurium and bismuth, in the shape of a doughnut. In this embodiment, a DVD-RAM (Digital Video Disk—Random Access Memory) is taken as an example of the optical disk.

Figure 2:
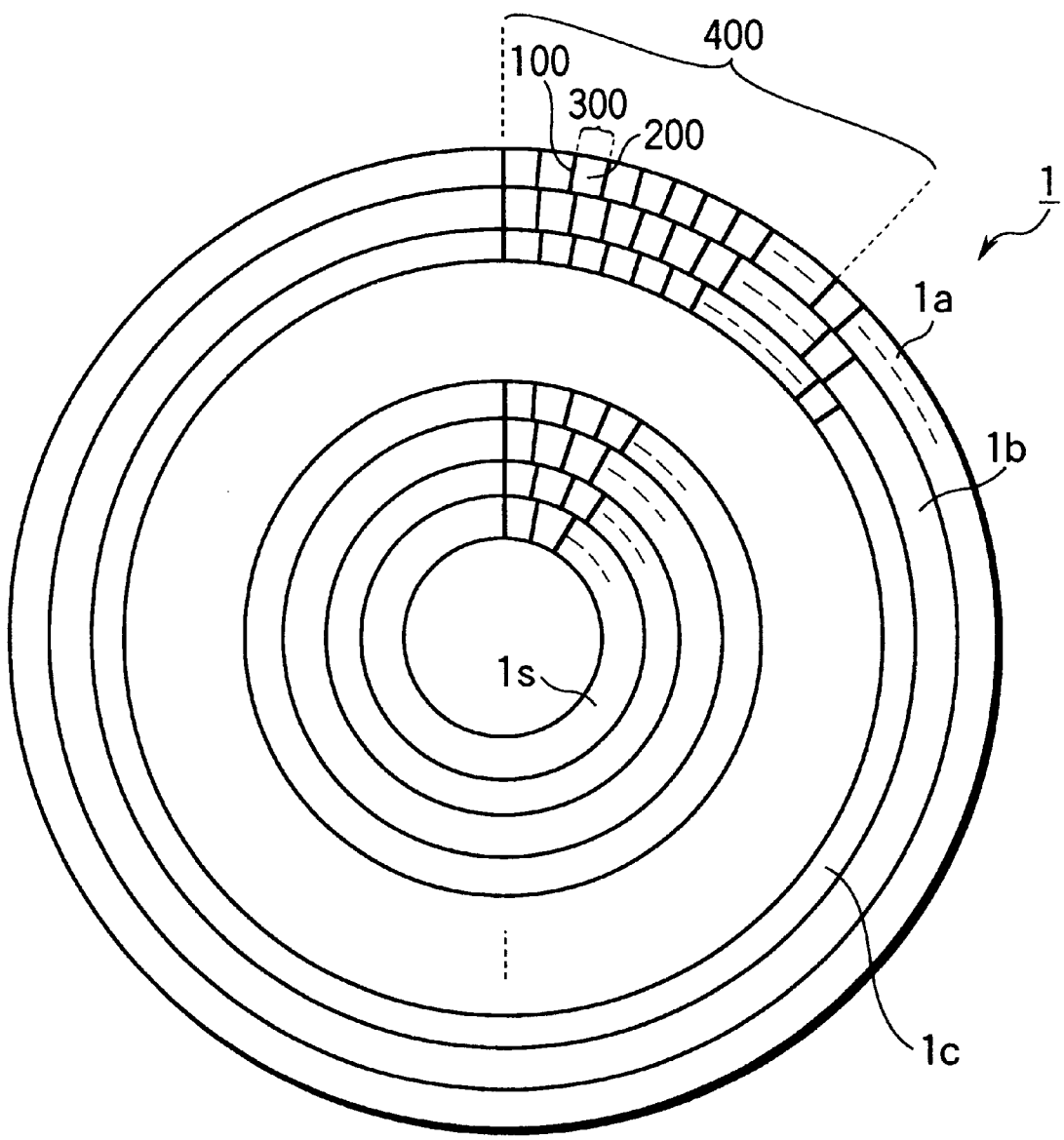
FIG. 2 is a view showing an example of a sector format.

Referring to FIG. 2, the format of a track formed in the optical disk 1 will be described. The optical disk 1 is divided into a plurality of zones of a plurality of tracks in its radial direction, for example, 19 zones 1a, 1b, 1c, . . . , 1s. Each of the zones includes a plurality of consecutive sector regions 300. Each of the sector regions 300 has a header section 100 and a data section 200. Address data indicative of a position on the track is recorded in the header section 100, while user data and error correction codes are recorded in the data section 200. Furthermore, an ECC block 400 is constituted of a predetermined number of sector regions, for example, 16 sector regions.

The arrangement of the sector regions will now be described briefly. As a typical example, there are two types of sector configuration systems a CLV (Constant Linear Velocity) system and a CAV (Constant Angular Velocity) system.

According to the CLV system, memory capacity can be increased, and the rotation speed of a motor is controlled such that the linear velocity of a track for recording and reproduction becomes constant. A sector region of the fixed length can thus be formed in the track and data can be recorded in synchronization with a fixed clock. Furthermore, data can be reproduced at a fixed frequency. This system has the advantage of allowing substantially the same recording/reproduction conditions to be set anywhere on the disk.

In the CAV system, the rotation speed and the recording/reproduction frequency of a motor are constant. This system has the advantage that the arrangement of a control circuit of a motor is simpler than that in the CLV system, whereas it has the disadvantage that the recording capacity per track depends upon the length of the innermost track of the disk. In other words, the memory capacity in the CAV system is smaller than that in the CLV system.

Referring to FIG. 1 again, the optical disk apparatus will be described below.

The optical disk 1 is rotated by a motor 3, and the motor 3 is controlled by a motor control circuit 4. For example, when the CLV system is adopted, the motor 3 is controlled such that its rotation speed is in inverse proportion to the radius of the track.

Information is recorded on/reproduced from the optical disk 1 by means of an optical head serving as a recording/reproduction means. The optical head 5 is fixed to a driving coil 7 constituting a movable section of a linear motor 6. The driving coil 7 is connected to a linear motor control circuit 8.

A speed detector 9 is connected to the linear motor control circuit 8 and transmits a speed signal of the optical head 5 to the circuit 8.

The linear motor 6 is provided with a permanent magnet at its fixing portion. The driving coil 7 is excited by the linear motor control circuit 8 to move the optical head 5 in the radial direction of the optical disk 1.

An objective 10 is supported to the optical head 5 by means of a wire or a spring plate (not shown). The objective 10 is moved in the focusing direction (in the optical axis direction of the lens) by a driving coil 11 and then in the tracking direction (in the direction perpendicular to the optical axis of the lens) by a driving coil 12.

A laser beam is emitted from a semiconductor laser (or an argon neon laser) 19, which is driven by a laser control circuit 13 serving as a recording means and a control means, and incident on the optical disk 1 through a collimator lens 20, a half prism 21 and the objective 10. The light reflected by the optical disk 1 is guided to a photodetector 24 via the objective 10, half prism 21, a focusing lens 22 and a cylindrical lens 23.

The photodetector 24 is constituted of four photodetecting cells 24a, 24b, 24c and 24d. The output signal of the photodetecting cell 24a is supplied to one end of each of adders 26a and 26c through an amplifier 25a, that of the photodetecting cell 24b is supplied to one end of each of adders 26b and 26d through an amplifier 25b, that of the photodetecting cell 24c is supplied to the other end of each of the adders 26a and 26d through amplifier 25c, and that of the photodetecting cell 24d is supplied to the other end of each of the adders 26b and 26c through an amplifier 25d.

The output signal of the adder 26a is supplied to an inverted input terminal of a differential amplifier OP2, and that of the adder 26b is supplied to a non-inverted input terminal of the differential amplifier OP2. Thus, the differential amplifier OP2 generates a signal regarding a focus point in accordance with a difference between the adders 26a and 26b and supplies the signal to a focusing control circuit 27. This circuit 27 generates a focus driving signal in response to the signal output from the differential amplifier OP2. The focus driving signal is sent to the driving coil 11. The driving coil 11 is so controlled that a laser beam is always just focused on the optical disk 1 based on the focus driving signal.

The output signal of the adder 26c is supplied to an inverted input terminal of a differential amplifier OP1, and that of the adder 26d is supplied to a non-inverted input terminal of the differential amplifier OP1. Thus, the differential amplifier OP1 generates a track differential signal according to a difference between the adders 26d and 26c and supplies the signal to a tracking control circuit 28. This circuit 28 generates a track driving signal in response to the track differential signal output from the differential amplifier OP1. The track driving signal is sent to the driving coil 12. The driving coil 12 is so controlled that a laser beam is incident upon a predetermined track of the optical disk 1 in response to the track driving signal. The track differential signal is also supplied to the linear motor control circuit 8.

When the above-described focusing and tracking are performed, the sum of output signals of the photodetecting cells 24a to 24d of the photodetector 24, i.e., the output signal of the adder 26e involves variations in reflectance of light reflected by pits (recording data) formed in the tracks. These output signals are supplied to a data reproducing circuit 18 serving as a reproducing means. This circuit 18 outputs a signal for allowing an access to the ECC block of an ID to be recorded and reproduction data corresponding to the ECC block of an ID to be reproduced, in response to the output signal.

The data reproduced by the data reproducing circuit 18, is supplied to an error correction circuit 32 through a bus 29. The error correction circuit 32, which serves as a recording data generation means and an error correction means, corrects an error by an error correction code in the reproduced data or supplies an error correction code to user data supplied from an interface circuit 35 and sends the data to the memory 2.

The reproduced data whose error has been corrected by the error correction circuit 32, is supplied to an optical disk control device 36 serving as an external device through the bus 29 and interface circuit 35. The device 36 supplies recording data to the error correction circuit 32 through the interface circuit 35 and bus 29.

While the objective 10 is being moved by the tracking control circuit 28, the linear motor control circuit 8 moves the linear motor 6 or the optical head 5 such that the objective 10 is located near the central part of the optical head 5.

A data generation circuit 14 is provided, as a recording data generation means, at the stage precedent to the laser control circuit 13. This circuit 14 includes an ECC block data generation circuit 14a and a modulation circuit 14b. The circuit 14a converts format data of the ECC block as recording data supplied from the error correction circuit 32, into format data of the ECC block to which a sync code is given. The modulation circuit 14b modulates the recording data output from the ECC block data generation circuit 14a by a 8–16 code conversion method or the like. The data generation circuit 14 is supplied with recording data to which an error correction code is attached by the error correction circuit 32. The error correction circuit 32 is supplied with user data from the optical disk control device 36 through the interface circuit 35 and bus 29.

The optical disk apparatus includes a D/A converter 31. The D/A converter 31 converts digital data to analog data when necessary in order to exchange data among the focusing control circuit 27, tracking control circuit 28, linear motor control circuit 8 and CPU 30.

The motor control circuit 4, linear motor control circuit 8, laser control circuit 15, data reproducing circuit 18, focusing control circuit 27, tracking control circuit 28, error correction circuit 32, etc. are controlled by the CPU 30 through the bus 29. The CPU 30 performs a predetermined operation by the program recorded in the memory 33.

Hereinafter the thrust of the present invention will be described. Assume that user data is recorded in one ECC block, i.e., 16 sector regions. As illustrated in FIGS. 3 to 7, a first error correction code (first error correcting parity data) is added to the user data to generate first recording data, and a second error correction code (second error correcting parity data) is added to the first recording data to generate second recording data. The second recording data is recorded on the optical disk. In the present invention, an error correction code is added twice. The second recording data is to be recorded in one ECC block and thus it is recorded in a plurality of sectors, i.e., 16 sectors. ECC1 indicates the first error correction code, while ECC2 indicates the second error correction code.

What is to be noted here is that all data of the second error correction code are symbol 0. Naturally the data of the first error correction code is remainder 0. Even though 0 is added to the first error correction code, the remainder is still 0. The second error correction code is constant data which does not vary even though part of user data is rewritten. Rewriting is therefore completed simply by rewriting part of user data and the first error correction code and, in this case, the second error correction code need not be rewritten. Consequently, the entire second recording data need not be rewritten when part of user data is rewritten.

The foregoing will be described in more detail. The above user data is provided from the optical disk control device 36 and acquired by the interface circuit 35 serving as an acquiring means and then supplied to the error correction circuit 32 through the bus 29. The circuit 32 executes the process shown in FIGS. 3 to 7 under control of the CPU 30 to generate the second recording data from the user data. Hereinafter a process of generating the second recording data from the user data will be describe in detail.

Figure 3:
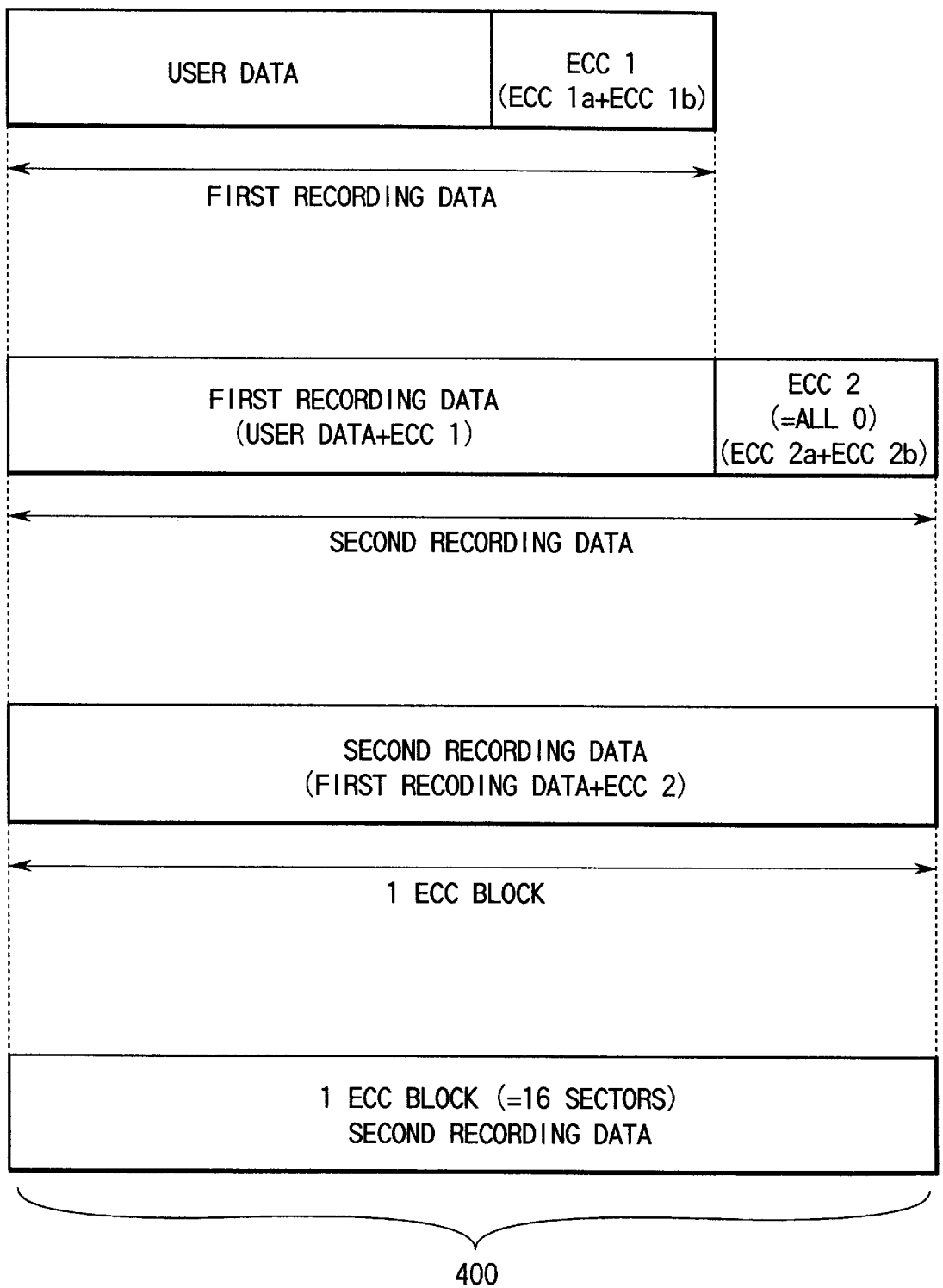
FIG. 3 is a view of a process of generating second recording data from user data.
Figure 4:
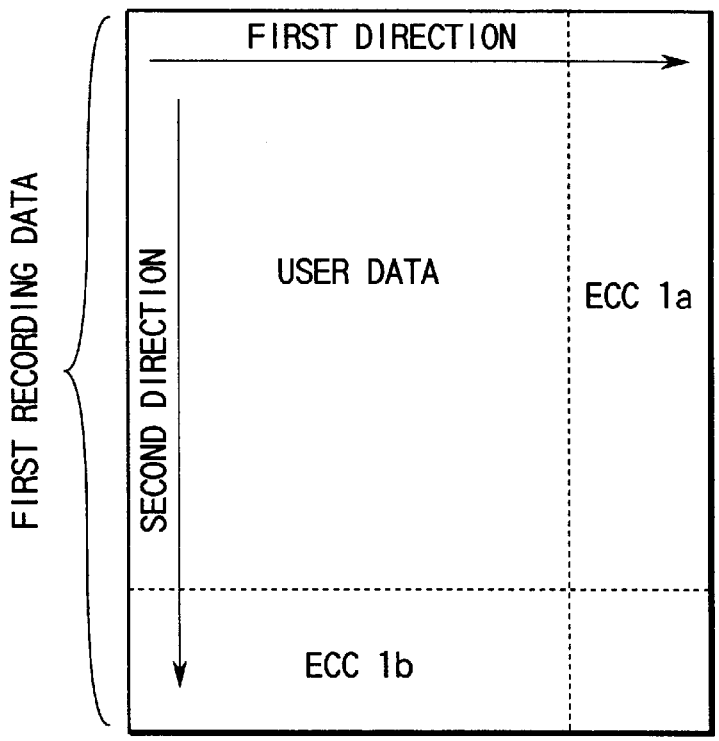
FIG. 4 is a view of user data to which a first error correction code is added.

Assume in FIGS. 3 and 4 that the user data is data recorded in two dimensions including a first direction (horizontal direction) and a second direction (vertical direction) perpendicular to the first direction. Also assume that the user data is divided into 16 divided user data portions, and the 16 divided portions are recorded in one ECC block, i.e., 16 sectors.

In FIGS. 3 and 4, ECC1a indicates a first-direction error correction code for correcting an error of a first-direction data included in user data, while ECC1b shows a second-direction error correction code for correcting an error of a second-direction data included in user data. These error correction codes ECC1a and ECC1b are combined into ECC1. ECC1 is the first error correction code.

The first error correction code is added to the user data to generate first recording data. In other words, the first recording data includes both the user data and first error correction code.

Figure 5:
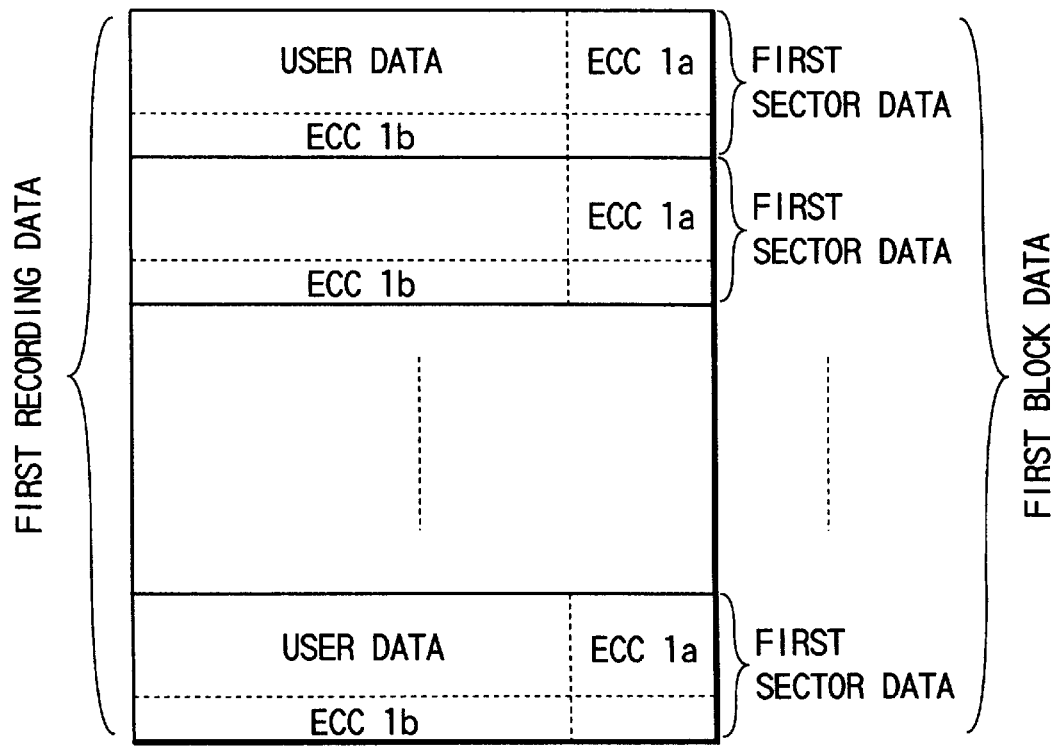
FIG. 5 is a view of 16 divided user data to which 16 divided first error correction codes are added.

The first recording data shown in FIG. 4 is converted into the first recording data shown in FIG. 5. In other words, the user data is divided into 16 divided user data portions and the first error correction code is divided into 16 first divided error correction codes. These 16 divided user data portions and 16 first divided error correction codes are combined with each other in one-to-one correspondence to form 16 first sector data. The block constituted by 16 first sector data is called first block data.

Figure 6:
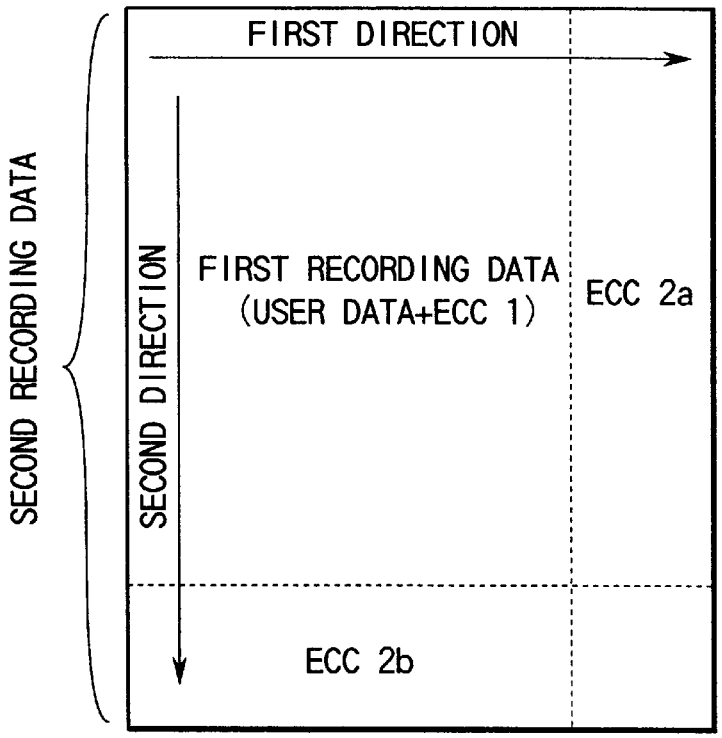
FIG. 6 is a view of first recording data to which a second error correction code is added.

Referring to FIGS. 3 and 6, the first recording data will be described below. As stated above, the first recording data includes both the user data and first error correction code. Assume that the first recording data is recorded in two dimensions including a first direction (horizontal direction) and a second direction (vertical direction) perpendicular to the first direction. Also assume that the first recording data portions is divided into 16 divided first recording data, which are recorded in one ECC block, i.e., 16 sectors.

In FIGS. 3 and 6, ECC2a indicates a first-direction error correction code for correcting an error of a first-direction data included in the first recording data, while ECC2b shows a second-direction error correction code for correcting an error of a second-direction data included in the first recording data. These error correction codes ECC2a and ECC2b are combined into ECC2. ECC2 is the second error correction code.

The second error correction code is added to the first recording data to generate second recording data. In other words, the second recording data includes both the first recording data and second error correction code.

Figure 7:
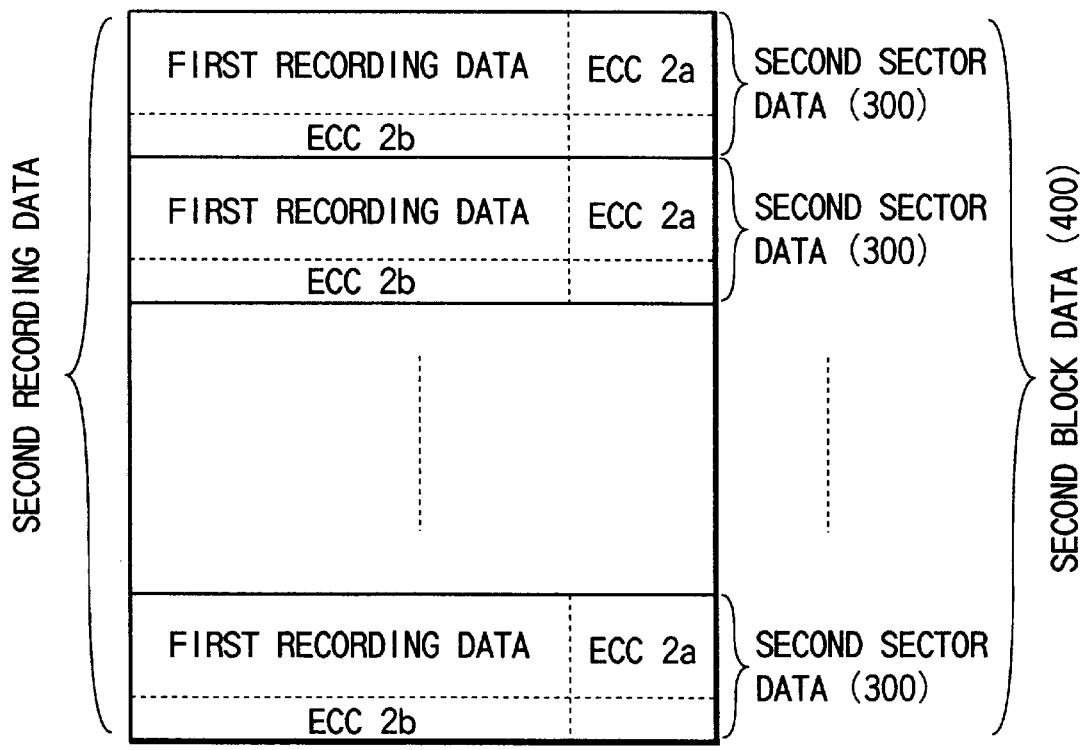
FIG. 7 is a view of 16 divided first recording data to which 16 divided second error correction codes are added.

The second recording data shown in FIG. 6 is converted into the second recording data shown in FIG. 7. In other words, the first recording data is divided into 16 first divided recording data portions and the second error correction code is divided into 16 second divided error correction codes. These 16 first divided recording data portions and 16 second divided error correction codes are combined with each other in one-to-one correspondence to form 16 second sector data. The block constituted by 16 second sector data is called second block data.

As illustrated in FIG. 3, the user data, first error correction code and second error correction code are recorded in one ECC block. Thus, the user data is limited to a capacity of one ECC block from which data of the first error correction code and second error correction code is subtracted. That is, an amount of data of one ECC block≧an amount of user data+an amount of data of the first error correction code+an amount of data of the second error correction code.

Figure 15:
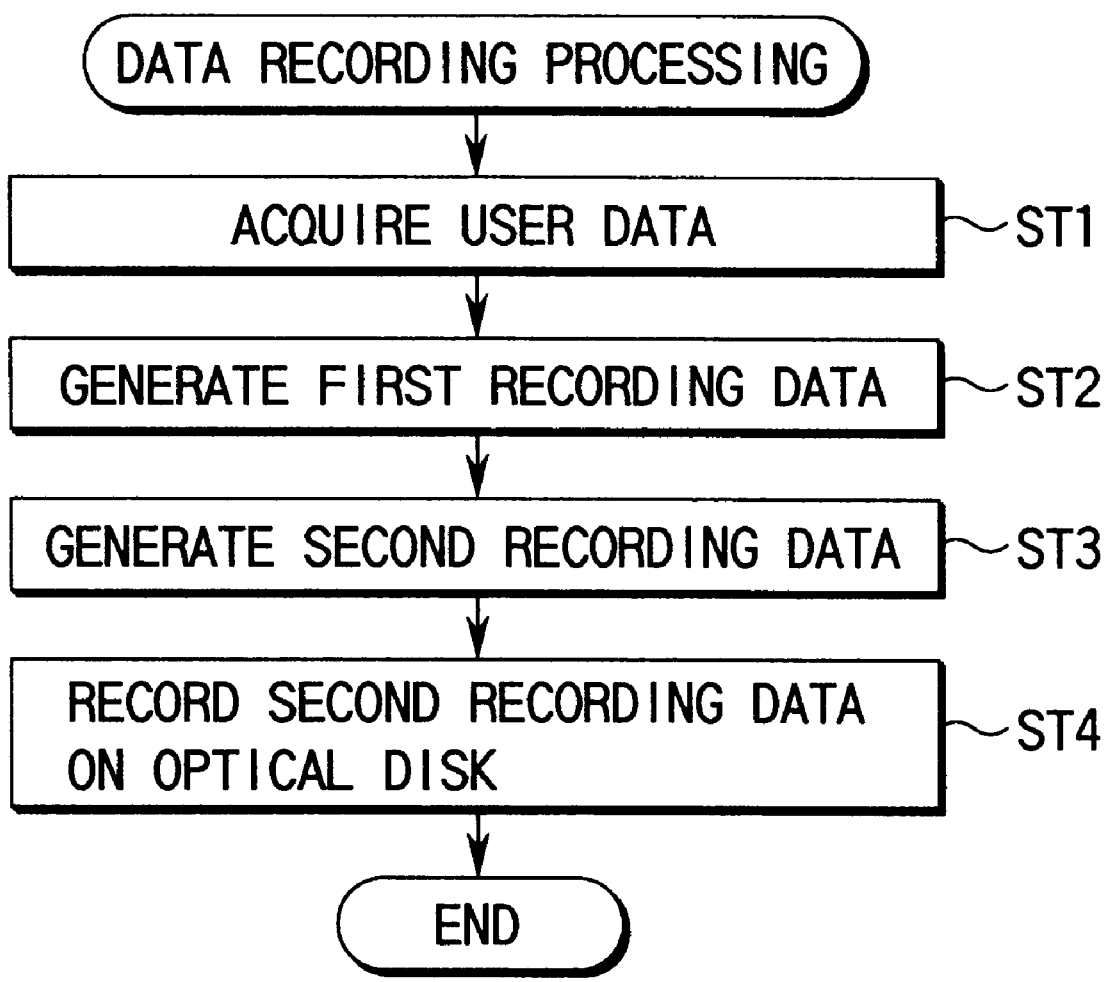
FIG. 15 is a flowchart showing a process from a step of generating second recording data from user data to a step of recording the second recording data on the optical disk.

The process of recording the second recording data, which is generated through the above process, on the optical disk, will be described according to the flowchart of FIG. 15.

First the user data provided by the optical disk control device 36 is acquired by the interface circuit 35 (step ST1). This user data is supplied to the error correction circuit 32 through the bus 29.

The error correction circuit 32 adds a first error correction code to the user data under control of the CPU 30 thereby to generate the first recording data (step ST2). The circuit 32 also adds a second error correction code to the first recording data to generate the second recording data (step ST3). The second recording data is involved in the light beam, and this beam is emitted to the optical disk, thereby recording the second recording data on the optical disk (step ST4).

Here the advantage of the present invention will be described in brief.

Conventionally, the first recording data, as shown in FIG. 5, is generated from user data and recorded on an optical disk. In other words, each of first sector data is recorded in its corresponding sector. If, in this case, user data in arbitrary first sector data is rewritten, the first error correction code is changed and thus has to be rewritten. Therefore, when the user data in the arbitrary first sector data has to be rewritten, data of the whole ECC block including the arbitrary first sector data should be rewritten.

The above causes problems of decrease in data recording speed, deterioration in recording film, variations in attribute of verification, etc. Assuming that a specific ECC block includes a sector in which verified data is recorded and, in this case, data is recorded in another sector of the ECC block without verification, data will be overwritten in all sectors of the specific ECC block without verification. This reduces in reliability of data. The larger the number of sectors constituting an ECC block, the larger the number of times of overwrite. The recording film is thus degraded. Furthermore, the recording time is lengthened since data of the whole ECC block is rewritten.

According to the present invention, the second recording data is generated from user data and recorded on the optical disk through the process shown in FIGS. 3 to 7. More specifically, each of the second sector data is recorded in its corresponding sector. If, in this case, user data of the arbitrary second sector data is rewritten, the first error correction code is changed and thus has to be rewritten. Since, however, the second error correction code is not changed, it need not be rewritten. Even though user data of arbitrary second sector data is rewritten, the second sector data has only to be rewritten.

Figure 8:
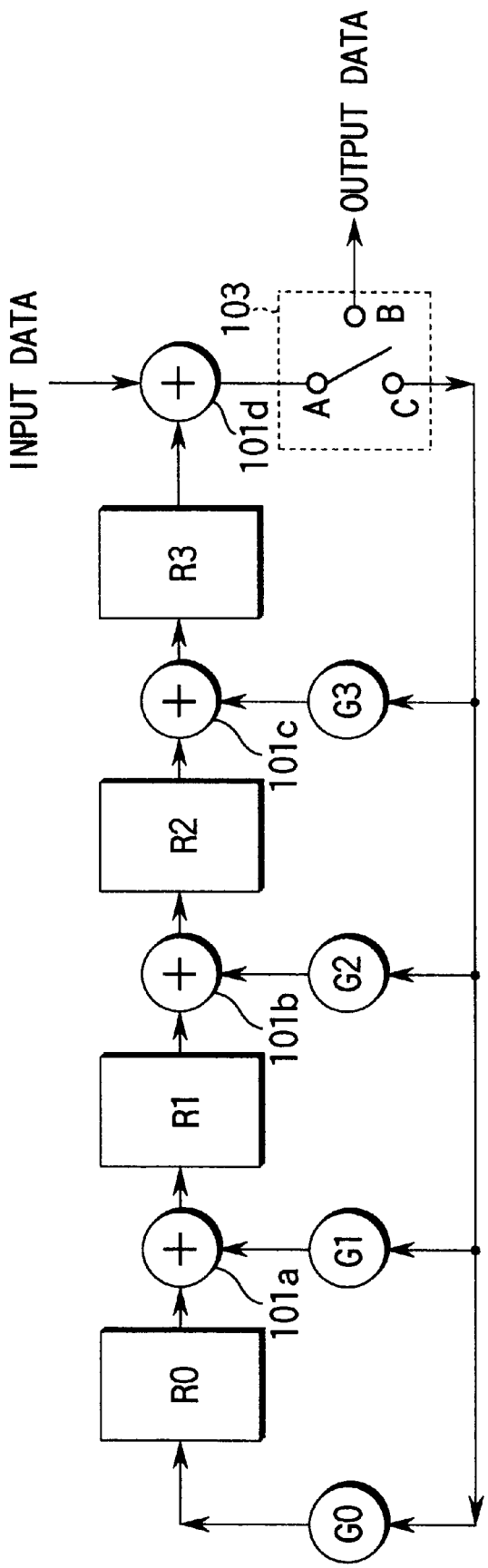
FIG. 8 is a schematic view of an error correction code generation section of an error correction circuit.

The generation of the first and second error correction codes by the error correction circuit 32 will be described. FIG. 8 is a schematic view of an error correction code generation section of the error correction circuit 32.

The error correction code generation section includes shift registers R0, R1, R2 and R3, exclusive OR circuits 101a, 101b, 101c and 101d, memories G0, G1, G2 and G3, and a switching circuit 103.

The memory G0 receives and converts data according to the Table shown in FIG. 9, and outputs the converted data. According to the Table, for example, input data "01" is converted to output data "40" and, in other words, when data "01" is input to the memory G0, the memory G0 outputs data "40."

The memory G1 receives and converts data according to the Table shown in FIG. 10, and outputs the converted data. According to the Table, for example, input data "01" is converted to output data "78" and, in other words, when data "01" is input to the memory G1, the memory G1 outputs data "78."

The memory G2 receives and converts data according to the Table shown in FIG. 11, and outputs the converted data. According to the Table, for example, input data "01" is converted to output data "36" and, in other words, when data "01" is input to the memory G2, the memory G2 outputs data "36."

The memory G3 receives and converts data according to the Table shown in FIG. 12, and outputs the converted data. According to the Table, for example, input data "01" is converted to output data "0F" and, in other words, when data "01" is input to the memory G3, the memory G3 outputs data "0F."

The output data of the memory G0 is supplied to an exclusive OR circuit 101a through a register R0. The output data of the memory G1 is also supplied to the exclusive OR circuit 101a. The output data of the memory G2 is supplied to an exclusive OR circuit 101b. The output data of the memory G3 is supplied to an exclusive OR circuit 101c.

The exclusive OR circuit 101a performs an exclusive-OR operation of the output data of memory G0 provided through the register R0 and the output data of the memory G1, and supplies an operation result A to the register R1.

The exclusive OR circuit 101b performs an exclusive-OR operation of the operation result A provided through the register R1 and the output data of the memory G2, and supplies an operation result B to the register R2.

The exclusive OR circuit 101c performs an exclusive-OR operation of the operation result B provided through the register R2 and the output data of the memory G3, and supplies an operation result C to the register R3.

The exclusive OR circuit 101d performs an exclusive-OR operation of the operation result C provided through the register R3 and user data input to the error correction code generation circuit, and supplies an operation result D.

The switching circuit 103 connects points A and C or points A and B.

User data is input to the error correction code generation circuit having the foregoing constitution for every symbol. The values remaining in the shift registers R0 to R3 after all user data are input to the error correction code generation section, correspond to the first error correction codes. Moreover, the values remaining in the shift registers R0 to R3 after the first recording data is input to the error correction code generation circuit, correspond to the second error correction codes.

All data of the second error correction code are symbol 0. If all the data are not symbol 0, the first recording data includes an error.

The generation of the first and second error correction codes will be described more specifically.

The codes are generated as follows.

The following generator polynomial is expressed with respect to the elements of the Galois field GF $(2^8)$:

$$G_p(x) = (X + \alpha^3)(X + \alpha^2)(X + \alpha)(X + 1) \quad (1)$$
$$= G3 \cdot X^3 + G2 \cdot X^2 + G1 \cdot X + G0$$

where G3 to G0 are memories as shown in FIGS. 9 to 12.

The codes are generated by the error correction code generation section shown in FIG. 8, using the above generator polynomial (1). When data is input to the error correction code generation section, the points A and C of the switching circuit 103 are connected to each other. When all the data are input, the points A and C are disconnected and the points A and B are connected, and a remainder, i.e., an error correction code is output.

If an information polynomial is given as follows, the values of registers R0 to R3 are varies as shown in FIG. 13:

$$I(X)=56X^4+F4X^3+ACX^2+03X+98 \quad (2)$$

The code is thus given as follows:

$$C_1(X)=56X^8+F4X^7+ACX^6+03X^5+98X^4+0.5X^3+44X^2+6DX+B9 \quad (3)$$

If the polynomial (3) is divided by the generator polynomial (1) to obtain a remainder, the remainder is zero. If, actually, the subtraction is performed using the error correction code generation section, the values of registers R0 to R3 are varied as illustrated in FIG. 14.

If the coded data is coded further, the following code is generated.

$$C_2(X)=56X^{12}+F4X^{11}+ACX^{10}+03X^9+98X^8+05X^7+44X^6+6DX^5+B9X^4) \quad$$

The coefficients of the above polynomial (4) are 56, F4, AC, 03, 98, 05, 44, 6D, B9, 00, 00, 00 and 00. The second error correction code can always be set to a constant value of zero on principle by the double coding.

The reproduction of the second recording data from the optical disk will now be described.

Assume that the second recording data is recorded on the optical disk. The optical disk is irradiated with a light beam. The photodetector 24 detects light reflected by the optical disk. The reflected light is reproduced by the data reproduction circuit 18 and, in other words, the second recording data is reproduced. The reproduced second recording data is supplied to the error correction circuit 32. The circuit 32 corrects an error of the first recording data by the second error correction code added to the second recording data. The circuit 32 also extracts user data from the first recording data. The extracted user data is supplied to the optical disk control device 36 through the bus 29 and interface circuit 35.

The present invention provides an optical disk apparatus and a data recording method capable of completion of recording or rewriting of data by recording or rewriting only data in a target sector region. The present invention also provides a method for generating recording data to complete recording data by recording only the data in a target sector region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An optical disk apparatus for recording predetermined data on an optical disk, said optical disk having a concentric or spiral track for recording data and a plurality of sector regions each having a predetermined track length, said apparatus comprising:

first data generation means for generating first error correcting parity data from user data recorded two-dimensionally in both a first direction and a second direction perpendicular to the first direction, said first error correcting parity data being constituted by a first error correcting parity data item for correcting an error of said user data recorded in the first direction and a second error correcting parity data item for correcting an error of said user data recorded in the second direction;

second data generation means for dividing said user data into a predetermined number of divided user data portions, for dividing said first error correcting parity data into a predetermined number of first divided error correcting parity data portions, and for combining said predetermined number of divided user data portions and said predetermined number of first divided error correcting parity data portions with each other in a one-to-one relationship to generate a predetermined number of first sector data;

third data generation means for generating second error correcting parity data from first recording data including said predetermined number of first sector data, said second error correcting parity data for correcting an error of first recording data recorded in the second direction;

fourth data generation means for dividing said first recording data into a predetermined number of divided recording data portions, for dividing said second error correcting parity data into a predetermined number of second divided error correcting parity data portions, and combining said predetermined number of divided recording data portions and said predetermined number of second divided error correcting parity data portions with each other in a one-to-one relationship to generate a predetermined number of second sector data; and recording means for recording second recording data including said predetermined number of second sector data in said optical disk such that said predetermined number of second sector data correspond to said plurality of sector regions in a one-to-one relationship.

2. The optical disk apparatus according to claim 1, wherein said third data generation means includes generation means for generating second error correcting parity data constituted by 0 symbols.

3. The optical disk apparatus according to claim 1, further comprising:

reproduction means for emitting a light beam to said optical disk on which said second recording data is recorded, receiving light reflected by said optical disk, and reproducing said second recording data involved in the reflected light; and error correction means for correcting an error of said first recording data included in said second recording data reproduced by said reproduction means, based on said second error correcting parity data included in said second recording data.

4. An optical disk apparatus for recording predetermined data on an optical disk, said optical disk having a concentric or spiral track for recording data and a plurality of sector regions each having a predetermined track length, said apparatus comprising:

first data generation means for generating first error correcting parity data from user data recorded two-dimensionally in both a first direction and a second direction perpendicular to the first direction, said first error correcting parity data being constituted by a first error correcting parity data item for correcting an error of said user data recorded in the first direction and a second error correcting parity data item for correcting an error of the user data recorded in the second direction;

second data generation means for dividing said user data into a predetermined number of divided user data portions, for dividing said first error correcting parity data into a predetermined number of first divided error correcting parity data portions, and for combining said predetermined number of divided user data portions and said predetermined number of first divided error correcting parity data portions with each other in a one-to-one relationship to generate a predetermined number of first sector data;

third data generation means for generating second error correcting parity data from first recording data including said predetermined number of first sector data, said second error correcting parity data being constituted by a third error correcting parity data item for correcting an error of first recording data recorded in the first direction and a fourth error correcting parity data item for correcting an error of first recording data recorded in the second direction;

fourth data generation means for dividing said first recording data into a predetermined number of divided recording data portions, for dividing said second error correcting parity data into a predetermined number of second divided error correcting parity data portions, and for combining said predetermined number of divided recording data portions and said predetermined number of second divided error correcting parity data portions with each other in a one-to-one relationship to generate a predetermined number of second sector data; and recording means for recording second recording data including said predetermined number of second sector data in said optical disk such that said predetermined number of second sector data correspond to said plurality of sector regions in a one-to-one relationship.

5. The optical disk apparatus according to claim 4, wherein said third data generation means includes generation means for generating second error correcting parity data constituted by 0 symbols.

6. The optical disk apparatus according to claim 4, further comprising:

reproduction means for emitting a light beam to said optical disk on which said second recording data is recorded, receiving light reflected by said optical disk, and reproducing said second recording data involved in the reflected light; and error correction means for correcting an error of said first recording data included in said second recording data reproduced by said reproduction means, based on said second error correcting parity data included in said second recording data.

7. A data recording method for recording predetermined data on an optical disk, said optical disk having a concentric or spiral track for recording data and a plurality of sector regions each having a predetermined track length, said apparatus comprising:

generating first error correcting parity data from user data recorded two-dimensionally in both a first direction and a second direction perpendicular to the first direction, said first error correcting parity data being constituted by a first error correcting parity data item for correcting an error of said user data recorded in the first direction and a second error correcting parity data item for correcting an error of said user data recorded in the second direction;

dividing said user data into a predetermined number of divided user data portions, dividing said first error correcting parity data into a predetermined number of first divided error correcting parity data portions, and combining said predetermined number of divided user data portions and said predetermined number of first divided error correcting parity data portions with each other in a one-to-one relationship to generate a predetermined number of first sector data;

generating second error correcting parity data from first recording data including said predetermined number of first sector data, said second error correcting parity data being constituted by a third error correcting parity data item for correcting an error of first recording data recorded in the first direction and a fourth error correcting parity data item for correcting an error of first recording data recorded in the second direction;

dividing said first recording data into a predetermined number of divided recording data, dividing said second error correcting parity data into a predetermined number of second divided error correcting parity data portions, and combining said predetermined number of divided recording data portions and said predetermined number of second divided error correcting parity data portions with each other in a one-to-one relationship to generate a predetermined number of second sector data; and recording second recording data including said predetermined number of second sector data in said optical disk such that said predetermined number of second sector data correspond to said plurality of sector regions in a one-to-one relationship.

8. The data recording method according to claim 7, wherein said generating of said second error correcting parity data includes generating second error correcting parity data constituted by 0 symbols.

9. The data recording method according to claim 7, further comprising, emitting a light beam to said optical disk on which said second recording data is recorded, receiving light reflected by said optical disk, and reproducing said second recording data involved in the reflected light; and correcting an error of said first recording data included in said second recording data reproduced by said second recording data reproducing step, based on the second error correcting parity data included in said second recording data.

* * * * *